(12) United States Patent
Inui et al.

(10) Patent No.: US 10,980,215 B2
(45) Date of Patent: *Apr. 20, 2021

(54) TEAT OPENING PROTECTION PATCH FOR LIVESTOCK

(71) Applicant: TOKUYAMA CORPORATION, Shunan (JP)

(72) Inventors: Yoji Inui, Shunan (JP); Hitoshi Kondo, Shunan (JP); Katsuhiro Shirai, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,095

(22) Filed: Oct. 8, 2019

(65) Prior Publication Data

US 2020/0029531 A1    Jan. 30, 2020

Related U.S. Application Data

(63) Continuation of application No. 16/073,572, filed as application No. PCT/JP2017/005756 on Feb. 16, 2017, now Pat. No. 10,531,640.

(30) Foreign Application Priority Data

Feb. 29, 2016    (JP) ................................. 2016-037458
Apr. 14, 2016    (JP) ................................. 2016-081396

(51) Int. Cl.
*A01K 13/00*     (2006.01)
*A61D 9/00*      (2006.01)
(Continued)

(52) U.S. Cl.
CPC ............... *A01K 13/006* (2013.01); *A01J 7/00* (2013.01); *A01J 7/04* (2013.01); *A01K 13/00* (2013.01);
(Continued)

(58) Field of Classification Search
CPC ...................................................... A01K 13/006
(Continued)

(56) References Cited

U.S. PATENT DOCUMENTS 4,917,112 A *   4/1990   Kalt ...................... A61F 13/023
                                                                            128/888
5,529,770 A      6/1996   McKinzie et al.
(Continued)

FOREIGN PATENT DOCUMENTS

CN        85204929 U     8/1986
CN        2794467 Y      7/2006
(Continued)

OTHER PUBLICATIONS

International Search Report (PCT/ISA/210) issued in PCT/JP2017/005756, dated May 16, 2017.
(Continued)

*Primary Examiner* — Brent T O'Hern
(74) *Attorney, Agent, or Firm* — Birch, Stewart, Kolasch & Birch, LLP

(57) ABSTRACT

A teat opening protection patch is stuck to portions inclusive of the teat openings of livestock, and includes a laminate 1 of an elastic sheet 2 and an adhesive layer 3 laminated on one surface of the elastic sheet 2, the laminate 1 having a double-stretched tensile stress in a range of 0.1 to 5 N.

13 Claims, 6 Drawing Sheets

(51) Int. Cl.
*B32B 27/40* (2006.01)
*A01J 7/04* (2006.01)
*B32B 27/00* (2006.01)
*C09J 11/00* (2006.01)
*C09J 201/00* (2006.01)
*A01J 7/00* (2006.01)

(52) U.S. Cl.
CPC ............... *A61D 9/00* (2013.01); *B32B 27/00* (2013.01); *B32B 27/40* (2013.01); *C09J 11/00* (2013.01); *C09J 201/00* (2013.01); *B32B 2307/51* (2013.01); *B32B 2375/00* (2013.01); *B32B 2405/00* (2013.01); *B32B 2556/00* (2013.01)

(58) Field of Classification Search
USPC .......................................................... 428/99
See application file for complete search history.

(56) References Cited

U.S. PATENT DOCUMENTS

| | | | |
|---|---|---|---|
| 10,531,640 B2 * | 1/2020 | Inui | .......................... A61D 9/00 |
| 2011/0088624 A1 | 4/2011 | Kenndoff | |
| 2016/0158065 A1 | 6/2016 | Schiff et al. | |

FOREIGN PATENT DOCUMENTS

| | | |
|---|---|---|
| CN | 101732726 A | 6/2010 |
| CN | 201585320 U | 9/2010 |
| EP | 0 121 973 A1 | 10/1984 |
| JP | 11-155404 A | 6/1999 |
| JP | 2000-041529 A | 2/2000 |
| JP | 3404704 B2 | 5/2003 |
| JP | 2006-129795 A | 5/2006 |
| JP | 2016-002072 A | 1/2016 |
| JP | 2017-051105 A | 3/2017 |

OTHER PUBLICATIONS

Written Opinion (PCT/ISA/237) issued in PCT/JP2017/005756, dated May 16, 2017.
Office Action dated Apr. 24, 2019, issued in U.S. Appl. No. 16/073,572.
Office Action dated Jul. 5, 2019, issued in U.S. Appl. No. 16/073,572.
Chinese Office Action, dated Jul. 14, 2020, for corresponding Chinese Application No. 201780007197.3, with an English translation.

* cited by examiner

TEAT OPENING PROTECTION PATCH FOR LIVESTOCK

This application is a Continuation of U.S. application Ser. No. 16/073,572, filed Jul. 27, 2018, issued as U.S. Pat. No. 10,531,640 B2, which is the National Phase of PCT International Application PCT/JP2017/005756, filed Feb. 16, 2017, which claims priority under 35 U.S.C. 119(a) to Japanese Patent Application No. 2016-037458, filed on Feb. 29, 2016 and Japanese Patent Application No. 2016-081396, filed on Apr. 14, 2016. Each of the above application(s) is hereby expressly incorporated by reference, in its entirety, into the present application.

TECHNICAL FIELD

This invention relates to a teat opening protection patch for protecting the teat openings of livestock. More specifically, the invention relates to a teat opening protection patch for protecting the teat openings of livestock, the patch being so stuck to the teats as to cover the teat openings. The invention, further, relates to a method of protecting the teat openings of livestock.

BACKGROUND ART

One of serious diseases affecting the dairy cattle is the bovine mastitis which is an infectious disease caused by bacteria and other microorganisms that have entered into the breast through the teat opening, settled and multiplied therein. However, the factors of development are so complex that the disease has not been eradicated yet. If affected by the bovine mastitis, not only the amount of milk and the quality of milk decrease but also it becomes no longer allowable, if the cattle is treated with antibiotics, to ship the milk during the period of treatment due to the probable residence of the drugs. Moreover, if the symptoms are serious and the disease cannot be cured, then the affected cattle must be eliminated causing a tremendous damage in economy to the dairy farmers.

In order to prevent the bovine mastitis at present, it is a generally employed method to dip the teats in a dipping agent (sterilizing aqueous solution) before and after the milking in the lactation period of milking. This is to sterilize the mastitis-causing bacteria adhered to the surfaces of the teat skin. It has also been attempted to reduce the area to where the mastitis-causing bacteria have adhered by adding a skin condition-improving component such as moisturizer to the dipping agent. A variety of dipping agents have been proposed chiefly for pasteurization (e.g., patent documents 1 and 2), and many products have now been placed in the market.

A method has also been widely employed according to which in the dry period of not milking the cattle, antibiotics are injected into the breast through the teat openings at the beginning of the dry period so that the mastitis-causing bacteria may die out. In the initial stage of dry period, it is considered that the antibiotics exhibit sterilizing effect to some extent and are effective in the prevention of the bovine mastitis accompanied, however, by such problems as leakage of antibiotics from the teat openings, mixing of antibiotics into raw milk at the beginning of milking after the dry period has been finished, and advent of resistant bacteria against the antibiotics if they are used for extended periods of time. There has, further, been reported that the dairy cattle are prone to be newly affected by the bovine mastitis at an increased probability in the initial stage of dry period and in the last stage of dry period before the delivery. Therefore, it cannot be said that the countermeasure is sufficient for preventing the bovine mastitis by using antibiotics.

As a means for protecting the teats of dairy cattle from the mastitis-causing bacteria, therefore, there has been proposed an art of preventing bacteria and other microorganisms from entering into the breast through the teat openings.

For instance, a patent document 3 proposes a means of "dipping the teats in a teat-sealing agent to maintain the teats in a state where a thin film is formed on the teats closing the teat openings during the period of about 2 days to about 9 days in the initial stage of dry period of cattle when they are liable to be infected with the bovine mastitis and during the period of about 2 days to about 9 days before the delivery". By the above means, it is considered that the infection of the mastitis-causing bacteria is physically blocked, and the cattle can be prevented from being infected with the bovine mastitis. As the film-forming component in the teat-sealing agent, the patent document 3 exemplifies rubber materials such as urethane rubber, latex rubber, butadiene rubber, polyvinyl alcohol, liquid butyl rubber, liquid rubber, natural rubber, butyl rubber, nitrile rubber, chloroprene rubber, vinyl acetate rubber and the like rubbers. Namely, these rubber materials are dissolved in a solvent such as toluene or xylene, and the teats are dipped in the solution thereof (teat-sealing agent) to form a film of rubber material on the teats.

However, the film of rubber material formed by the above method cannot fully reliably adhere to the teats and tends to be easily removed from the teats. That is, the film of rubber material cannot, in many cases, maintain the teat openings closed during the above period of about 2 days to about 9 days during which the infection with the mastitis-causing bacteria must be blocked, and improvements have been desired.

A patent document 4 is proposing a teat protection material for cattle, that comprises a flexible film having waterproof property and a large stretching ratio at breakage and that is fixed by being wrapped round the teats.

In fact, however, the teat has a shape that becomes thin toward the teat opening at the end. Even if the above flexible film is wrapped round the teat, therefore, the film, in many cases, cannot be maintained to stay closely adhered to the teat opening which is the most essential part allowing to form a gap easily between the teat opening and the film. Formation of the gap causes a decrease in the degree of protecting the teat openings, as a matter of course. Moreover, the disease-causing bacteria such as germs may intrude through the gaps and, besides, the film is easily removed from the teats.

PRIOR ART DOCUMENTS

Patent Documents

Patent document 1: Japanese Patent No. 3404704
Patent document 2: JP-A-11-155404
Patent document 3: JP-A-2000-41529
Patent document 4: JP-A-2006-129795

OUTLINE OF THE INVENTION

Problems that the Invention is to Solve

It is, therefore, an object of the present invention to provide a teat protection material for protecting the teat openings, that stays closely adhered to the teat without peeling so as to cover the teat opening for about half a day in the milking period and for about one week in the dry period (e.g., initial stage of dry period and last stage of dry period before the delivery) when the cattle are liable to be easily infected with bacteria. Moreover, the present invention provides a teat protection material for protecting the teat openings, that stays closely adhered to the teat without peeling for not less than 10 days and, desirably, for about two weeks irrespective of the individual livestock in order to reliably prevent the infection in the dry period.

Another object of the present invention is to provide a teat protection material for protecting the teat openings, which facilitates the work for closely adhering the teat protection material to the teats so as to cover the teat openings.

A further object of the present invention is to provide a method of protecting the teats of livestock by using the protection material.

Means for Solving the Problems

According to the present invention, there is provided a teat opening protection patch which is stuck to portions inclusive of teat openings of livestock, including a laminate of an elastic sheet and an adhesive layer laminated on one surface of the elastic sheet, the laminate having a double-stretched tensile stress in a range of 0.1 to 5 N.

In the teat opening protection patch of the present invention, it is desired that:
(1) A removable protection film is laminated on the surface of the laminate on the side opposite to the adhesive layer, and a parting sheet is stuck to the surface of the adhesive layer;
(2) The elastic sheet is formed of a polyurethane; and
(3) The elastic sheet is colored.

Further, the teat opening protection patch of the invention can be divided into the one of the type (α) for sticking to the teat opening and the one of the type (β) for sticking to the side surface of the teat depending upon the main form of the laminate.

In the teat opening protection patch of the type (α) for sticking to the teat opening, there can be, preferably, employed an embodiment in which:
(1) The circle has a diameter, or the ellipse has a long axis, which is 5 to 40 mm and, specifically, 10 to 40 mm in length; and, further, an embodiment in which:
(2) The laminate has at least one slit that is stretching from the outer circumferential portion toward the central portion.

In the teat opening protection patch of the type (β) for sticking to the side surface of the teat, further, it is desired that:
(1) The laminate has a line symmetrical planar shape and includes:
 a circular or elliptic portion for sticking to the teat opening having, as the center, a point where a vertical line that is an axis of line symmetry intersects, at right angles thereto, a transverse line that equally divides a maximum length of the laminate into two in the direction of the vertical line; and
 a plurality of portions for sticking to the side surfaces of the teat and extending outwards from the portion for sticking to the teat opening;
 the portion for sticking to the teat opening being exposed to the exterior at a plurality of places interposing at least the vertical line or the transverse line among them;
(2) The laminate has a planar shape without any corner portion where the straight lines intersect each other;
(3) The diameter of the circle or the long axis of the ellipse forming the portion for sticking to the teat opening, has a length of 5 to 40 mm and, specifically, 10 to 40 mm;
(4) The portions for sticking to the side surfaces of the teat have a shape expanding outwards; and
(5) When a rectangular virtual circumscribing quadrilateral is formed on the planar shape of the laminate, the long side of the circumscribing Quadrilateral has a length in a range of 30 to 200 mm while the short side thereof has a length in a range of 20 to 150 mm.

According to the present invention, further, there is provided a method of protecting teat openings of livestock by sticking the surface of the teat opening protection patch on the side of the adhesive layer to the teats so as to cover the teat openings of the livestock.

In the above method, it is desired that a sterilizing agent is applied to the teat openings or is injected into the lactiferous ducts prior to sticking the teat opening protection patch.

Effects of the Invention

The teat opening protection patch of the present invention is used being stuck to the teats of livestock so as to cover the teat openings through a simple work without involving any cumbersome dipping work such as dipping the teats of livestock in a solution for forming a film.

Moreover, the protection patch (laminate) stuck to the teats not only excellently adheres to the teats but also has a suitable degree of elasticity, and undergoes the expansion and contraction so as to follow the change in the shape of the teats accompanying the motion of the livestock. Therefore, the protection patch stuck to the teats is very unlikely to be removed and is capable of reliably protecting the teat openings for a predetermined period of time in which it is said that the livestock can be easily infected with bacteria.

Moreover, the teat opening protection patch is so stuck to the teats as to cover the teat openings but is not fixed by being wound round the teats. Therefore, a sufficient degree of adhesion is secured between the protection patch and the teat opening which is an end portion of the teat, forming almost no gap between the teat opening and the protection patch and, therefore, reliably protecting the teat opening from being infected with bacteria.

According to the teat opening protection patch of the present invention as described above, it is allowed to efficiently prevent the livestock such as dairy cattle from infectious diseases such as bovine mastitis.

Moreover, by providing the protection patch with a layer of a function-imparting agent such as leakage-of-milk checking agent, germicide, moisturizer, or the like (or by blending the adhesive layer with a function-imparting agent), it becomes possible to impart functions to meet the needs of the dairy farmers.

MODES FOR CARRYING OUT THE INVENTION

Figure 1:
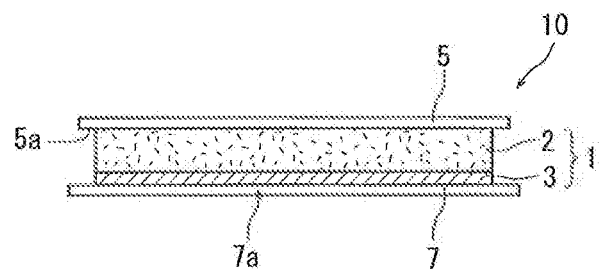
FIG. 1 It is a side sectional view of a teat opening protection patch of the present invention, FIG. 2 It is a sectional view schematically illustrating, together with a teat, the state of the teat opening protection patch of the present invention stuck to the teat.

Referring to FIG. 1, a teat opening protection patch (hereinafter often called simply "teat patch") of the present invention designated generally at 10 has a laminate designated at 1. The laminate 1 has a two-layer structure including an elastic sheet 2 and an adhesive layer 3 laminated on one whole surface of the elastic sheet 2.

Figure 2:
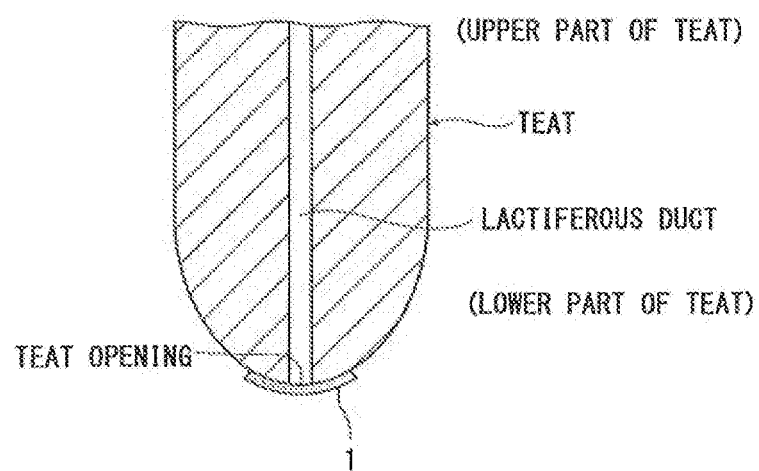

As shown in FIG. 2, the teat patch 10 is stuck, via the adhesive layer 3, to the teat so as to cover the teat opening. The lactiferous duct is stretching in the teat, and the end (lower end) of the teat is forming the teat opening where the lactiferous duct is exposed to the exterior. Therefore, the teat opening is covered with the teat patch 10 of the present invention to prevent the infection with bacteria through the teat opening.

From the standpoint of protecting the teat opening, therefore, the teat patch 10 may be constituted by the laminate 1 only. However, a protection film 5 is usually provided on the other surface of the elastic sheet 2 from the standpoint of handling, and a parting sheet 7 is usually stuck to the adhesive layer 3. That is, after the parting sheet 7 is removed, the adhesive layer 3 of the laminate 1 is stuck as shown in FIG. 2. Next, the protection film 5 is removed and, in this state, the laminate 1 is fixed to the teat (Laminate 1)

In the present invention, it is important that the laminate has a double-stretched tensile stress in a range of 0.1 to 5 N, specifically, 0.2 to 3 N and, most desirably, 0.2 to 1.0 N.

The double-stretched tensile stress is a stress necessary for stretching the laminate 1 into twice its length and is measured by using a tension tester. The stress has no directivity, and the value should lie within the above-mentioned range no matter in which direction the laminate is stretched into twice its length.

Described below is the reason why the double-stretched tensile stress is specified. The laminate 1 having the adhesive layer is often stuck to the teat being slightly stretched. Even after stuck to the teat, further, the livestock may move around or the size of the teat may vary, and the laminate 1 that has been stuck may often be stretched. By taking the stretched state into consideration, the stress is specified to be that of when the laminate 1 is stretched to twice its length. That is, upon specifying the stress of the laminate 1 of when it is stretched into twice its length, it is made possible to evaluate the capability of the laminate 1 that follows the change in the shape of the teat in a stretched state.

That is, the laminate 1 that exhibits the above double-stretched tensile stress means that the laminate 1 has a suitable degree of elasticity, undergoes the expansion or contraction depending on a change in the shape of the teat due to the motion of the livestock, and follows the change in the shape of the teat. If, for example, the laminate 1 has the double-stretched tensile stress that is smaller than the above range, then the laminate 1 stuck to the teat may stretch in excess of its limit. As a result, the laminate 1 is easily removed from the teat or is easily broken. Moreover, the laminate 1 becomes so soft that it becomes difficult to stick it to the teat. If the double-stretched tensile stress is larger than the above range, on the other hand, the laminate 1 becomes not capable of contracting to a sufficient degree. For example, if the shape of the teat varies due to the motion of the livestock, the laminate 1 becomes no longer capable of following the change in the shape of the teat, and also becomes liable to be easily removed from the teat.

It is, further, desired that the laminate 1 has a thickness in a range of 11 to 150 µm and a double-stretched tensile stress that lies in the above-mentioned range. If the thickness is too small, it becomes difficult to stick the laminate 1 to the teat. Besides, it also becomes difficult to remove the laminate 1 after the use from the teat. If the thickness is too large, on the other hand, the laminate 1 becomes less capable of following the change in the shape of the teat and becomes liable to be removed.

In order for the laminate 1 to become more capable of following the change in the shape of the teat and to improve the efficiency of the work for sticking the laminate, it is desired that the laminate 1 has a tensile modulus elasticity of not more than 1 MPa, specifically, 0.05 to not more than 0.5 MPa and most desirably, in a range of 0.03 to 0.3 MPa.

(Elastic Sheet 2)

The elastic sheet 2 that constitutes the laminate 1 can be formed by using an elastic material which, when the adhesive layer 3 is laminated thereon to form the laminate 1, enables the double-stretched tensile stress to lie in the above-mentioned range.

As the above elastic material, though not limited thereto only, there can be exemplified olefin elastomer, styrene elastomer, vinyl acetate elastomer, soft vinyl chloride elastomer and urethane elastomer Among these elastomers, the polyurethane is particularly desired since it remains excellently adhered to the protection film 5 that will be described later, and enables its property to be so adjusted that the double-stretched tensile stress can be obtained lying in the above-mentioned range. That is, to ensure the double-stretched tensile stress that lies within a predetermined range, the polymer may be suitably adjusted, i.e., the monomer composition (copolymerizing ratio), crystallinity, molecular weights, content of the plasticizer, etc. may be adjusted to lie in suitable ranges and, besides, the thickness of the sheet may be adjusted depending on the properties. Upon adjusting the double-stretched tensile stress by adjusting the properties and the thickness, it is made possible to form the elastic sheet 2 by using the polyurethane so as to exhibit a predetermined double-stretched tensile stress without the need of excessively decreasing the thickness. For instance, to attain the double-stretched tensile stress that lies in a predetermined range with the thickness of the laminate 1 lying in the above-mentioned range, it is most desired that the elastic sheet 2 is formed by using the polyurethane. The elastic sheet 2 formed by using the polyurethane is also advantageous from the standpoint of directly adhering and fixing the protection film 5 that will be described later without using any particular adhesive.

Moreover, use of the polyurethane elastic sheet 2 brings about the following advantage. Namely, the elastic sheet 2 is on the outermost surface of the laminate 1 that is stuck to the teat, and is adhesive by itself. Therefore, the surfaces of the elastic sheet 2 easily adhere to each other. Even in case the laminate 1 is floated or wrinkled, therefore, the floated•wrinkled portion of the elastic sheet 2 can be pressed and adhered to a portion of the elastic sheet 2 that is closely adhered to the teat. Thus the two firmly adhere to each other to reduce the degree of floating•wrinkling. As a result, it is considered that the elastic sheet 2 becomes less liable to be removed from the teat.

It is desired that the elastic sheet 2 has a thickness in a range of, usually, 10 to 100 µm. This is because the thickness of the laminate 1 on which the adhesive layer 3 that will be described later is laminated has been set to lie in the above-mentioned range (11 to 150 µm) and the adhesive layer 3 has a small thickness.

It is, further, desired that the elastic sheet 2 has been colored. Upon being colored, the laminate 1 that is stuck can be easily confirmed even in a dark cowshed facilitating the work for sticking and confirmation thereof.

Moreover, upon coloring the elastic sheet 2 and upon providing a plurality of the laminates 1 having elastic sheets 2 of different colors, the laminates 1 can be used in various manners as described below. Namely, each cattle has, usually, four teats. Here, upon changing the color of the laminate 1 that is to be stuck to the teat that appears to be infected with bacteria and needs treatment from the color of the laminate 1 to be stuck to the normal teats, the diseased teat can be treated efficiently. It is, further, allowable to change the color of the laminates 1 to be stuck to the teats depending on the livestock that appear to require treatment and the healthy livestock.

Moreover, upon changing the color of the laminate 1 depending on the day it was stuck to the teats of the livestock, it becomes easy to know how many days have passed after the livestock such as dairy cattle have entered the dry period.

Namely, use of the colored laminates 1 makes it possible to know the conditions of the individual livestock.

Here, it is desired that the elastic sheet 2, if it is colored, is formed in a two-layer structure including a colored layer and an uncolored layer to improve adhesiveness to the protection film 5 that will be described later, and adhere and fix the protection film 5 onto the uncolored layer.

(Adhesive Layer 3)

The adhesive layer 3 is laminated on one surface of the elastic sheet 2, and serves as the surface to be stuck to the teats.

The adhesive layer 3 can be formed by using a known adhesive agent that adheres not only to the elastic sheet 2 but also to the teats, and that can be quickly removed from the teats after the use.

The adhesive agent has been used for sticking plasters, and includes those of the types of rubber, acrylic, silicone and urethane. It is, however, desired to use, specifically, an adhesive agent of the (meth)acrylate type from such a standpoint that it is safe for the teats of livestock and does not develop rash.

The adhesive layer 3 has a thickness large enough to ensure sufficient degree of adhesiveness to the teat. However, under the condition that the laminate 1 has a thickness (total thickness of the elastic sheet 2 and the adhesive layer 3) in the above-mentioned range of 11 to 150 µm, usually it is desired that the adhesive layer 3 has a thickness of about 1 to about 50 µm.

(Protection Film 5)

The protection film 5 is laminated on the other surface of the elastic sheet 2 in order to prevent the deformation of the elastic sheet 2 during the storage, and to facilitate the sticking work by preventing the elastic sheet 2 from adhering to each other during the work of sticking.

That is, to use the teat patch 10 of the present invention, the parting sheet 7 is removed from the adhesive layer 3. The adhesive layer 3 is then at least partly stuck to the teat in a state where the protection film 5 has not yet been removed. In this state, the protection film 5 is removed from the laminate 1 (elastic sheet 2). Next, the adhesive layer 3 as a whole is adhered and fixed to the teat by being pushed by hand. Here, depending on the size of the laminate 1, the adhesive layer 3 as a whole is stuck to the teat and, thereafter, the protection film 5 is removed from the laminate 1.

Therefore, the protection film 5 must be stiff and must have a tensile modulus of elasticity larger than that of the elastic sheet 2. From such a point of view, as the protection film 5, there can be used a variety of thermoplastic resin films, for example, polyester films such as of polyethylene terephthalate (PET) or olefin resin films such as of polyethylene, polypropylene, etc. However, among them, a film having transparency can be favorably used since it enables the presence of the elastic sheet 2 (laminate 1) to be recognized. As the protection film 5, therefore, there can be particularly preferably used a polypropylene film and a polyester film because of their excellent transparency. The film may be any one of an unstretched film, a monoaxially stretched film or a biaxially stretched film.

The protection film 5 can also be laminated on the elastic sheet 2 by using an adhesive. In this case, however, the protection film 5 must be removed from the laminate 1 in a state where the adhesive layer 3 remains adhered to the teat, i.e., without causing the adhesive layer 3 to be removed from the teat. If the protection film 5 is laminated on the elastic sheet 2 by using the adhesive, therefore, t becomes necessary to adjust the adhering force. It is, therefore, desired that the protection film 5 is directly stuck to the elastic sheet 2 without using the adhesive from such a standpoint that there is no need of adjusting the adhering force. From the standpoint of directly sticking the protection film 5 to the elastic sheet 2, further, it is desired that the protection film 5 is, preferably, the above-mentioned polyester film such as of PET or the olefin resin film such as of polypropylene. The protection film 5 may have been treated for its surfaces by corona treatment, etc., or may not have been treated for, its surfaces. The surface treatment may be suitably executed by taking into consideration the adhesiveness to the elastic sheet 2.

As described above, it is desired that the protection film 5 has been joined to the elastic sheet 2 without using any adhesive. Moreover, it is desired that a portion 5a of the protection film 5 extending beyond the elastic sheet 2 is joined to the parting sheet 7 that will be described later in detail without using any adhesive. To stick the laminate 1 to the teat, first, the parting sheet 7 that will be described later in detail is removed, and the adhesive layer 3 is stuck directly to the teat. Thereafter, the protection film 5 is removed. Here, the protection film 5 applied with no adhesive can be easily removed facilitating the operability free from such an occurrence that the protection film 5 adheres to the hand or the like.

The protection film 5 may have a suitable thickness that does not hinder the work for removing it from the elastic sheet 2. From the standpoint of facilitating the removing work, however, it is desired that the protection film 5 has a size slightly larger than the elastic sheet 2 as shown in FIG. 1. That is, the portion 5a extending beyond the elastic sheet 2 is nipped and thus the protection film 5 is easily removed. For this purpose, the thickness of the protection film 5 may be determined by taking the thickness of the elastic sheet 2 into account. In practice, however, from the standpoint of operability, the thickness is, desirably, not less than 30 µm and, more desirably, not less than 40 µm. Though there is no specific upper limitation on the thickness of the protection film 5, the upper-limit thickness is 300 µm from the standpoint of operability and economy.

(Parting Sheet 7)

The parting sheet 7 is for preventing the adhesive layer 3 from adhering to each other during the production or during the storage, and is removed at the time of work for sticking to the teats.

Therefore, the parting sheet 7 may be the one that is held by the adhesive layer 3 when not in use and is easily removable. Namely, the parting sheet 7 is a parting paper such as silicone paper.

In order to reliably cover the adhesive layer 3, the parting sheet 7 is slightly larger than the adhesive layer 3. To facilitate the removing work, however, it is desired that the parting sheet 7 has a cutting line 7a formed at the central portion thereof as shown in FIG. 1 so as to be completely divided at the central portion. Namely, being completely divided at the central portion, the separating sheet 7 can be stuck in a manner as described below. First, the parting sheet 7 on one side is removed from the laminate 1 (that has the protection film 5), and the adhesive layer 3 of a portion from where it is removed is stuck to the teat. Next, the parting sheet 7 on the other side is removed from the laminate 1 (that has the protection film 5), and the adhesive layer 3 of a portion from where it is removed is stuck to the teat. The laminate 1 can thus be stuck through a plurality of steps. If the parting sheet 7 is all removed in one time of operation, then it becomes highly probable that the adhesive layer 3 adheres to each other due to the movement of the livestock. By sticking the laminate 1 through a plurality of steps, however, the probability of adhesion between the adhesive layers 3 can be decreased. The sticking method through the plurality of steps is particularly suited when there is used the laminate 1 of the present invention that employs the soft elastic sheet 2.

When the operation is conducted through the plurality of steps, too, the protection film 5 can be easily removed if the protection film 5 has no adhesive, and the operation can be further facilitated.

(Functionality of the Laminate)

The teat patch 10 of the present invention having the above-mentioned structure may be provided with predetermined functions by using such agents as sterilizer, moisturizer, leakage-of-milk checking agent, repellent and the like agents.

The above agents may be contained in the elastic sheet 2 or the adhesive layer 3 so far as they do not impair the functions of the elastic sheet 2 or the adhesive layer 3, may be applied on the surface of the elastic sheet 2 or the adhesive layer 3, or may be applied in an interface between the elastic sheet 2 and the adhesive layer 3 since the adhesive layer 3 has bleeding property.

As the sterilizer, there can be exemplified iodine compounds; metals such as silver, copper, zinc, titanium and iron and metal salts thereof; tea leaves powder; cypress powder; chitosan; benzalkonium chloride; benzethonium chloride; fatty acid esters such as monoglyceride caprylate; as well as triclosan, isopropylmethylphenol, cetyl pyridinium chloride, resorcin, trichlorocarbanide, Halocarban, Chlorhexidine, Chlorhexidine chloride, Chlorhexidine glyconate, Acrinol, sodium hypochlorite and hydrogen peroxide. Among them, the iodine compounds and silver are preferred from the standpoint of not causing skin irritation to human and livestock, sustenance of sterilizing effect and cost.

As the iodine compound, there can be exemplified iodine, povidone iodine, sodium iodate, potassium iodate, sodium iodide, potassium iodide and iodoform.

As the moisturizer, there can be exemplified polyhydric alcohols such as vaseline, glycerin, propylene glycol, 1,3-butylene glycol and sorbitol; pyrrolidone carboxylate; lactate; natural moisturizing components such as urea or sodium hyaluronate.

As the leakage-of-milk checking agent, there can be used a general reagent that develops a color upon reacting with proteins or sugars. The function-imparting agent layer may be any one of the sterilizing agent, moisturizer or leakage-of-milk checking agent, or may be comprised of a plurality of them.

The repellent is a so-called insecticide, and is a component stemming from a natural substance such as eucalyptus oil, chrysanthemumic acid or citronella, a natural pyrethroid such a pyrethrin, or is a synthetic pyrethroid such as allethrin.

The repellant is, usually, applied onto the surface of the elastic sheet 2 (surface on the side opposite to the adhesive layer 3). By using the repellent, the teats can be protected from such insects as horsefly and bees that are harmful to the cattle.

(Method of Protecting the Teats by Using the Teat Patch 10)

To use the above-mentioned teat patch 10 of the present invention, the parting sheet 7 and the protection film 5 are removed and then, as shown in FIG. 2, the laminate 1 is stuck via the adhesive layer 3 so as to cover the teat opening. This protects the teat opening, prevents the infection with bacteria through the teat opening, and prevents diseases such as bovine mastitis.

Prior to sticking the laminate 1 to the teats, it is also allowable to employ such means as applying the above-mentioned sterilizing agent onto the teat openings or inject the sterilizing agent into the lactiferous ducts.

(Form of the Laminate 1)

It was mentioned already that the above-mentioned teat patch 10 of the invention can be classified into the one of the type ($\alpha$) for sticking to the teat openings and the one of the type ($\beta$) for sticking to the side surfaces of the teats depending on the form (planar shape) of the laminate 1.

Figure 3:
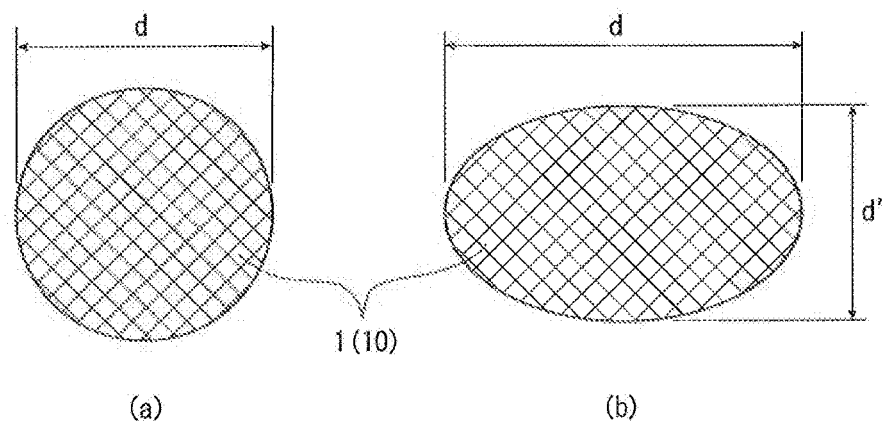
FIG. 3 It is a view showing a planar shape of the teat opening protection patch of the type (α).

Type ($\alpha$) for sticking to the teat openings;

The teat patch 10 of the type ($\alpha$) for sticking to the teat openings has the laminate 1 of a circular planar shape (see FIG. 3(a)) or an elliptic planar shape (FIG. 3(b)). The laminate 1 includes the elastic sheet 2 and the adhesive layer 3 as described above. Further, the laminate 1 is sold with the protection film 5 being laminated on the elastic sheet 2 and with the parting sheet 7 being stuck to the adhesive layer 3.

The laminate 1 has the least required size for completely covering the teat openings (see FIG. 3) and assumes the simplest form. As a result, in a state of being stuck to the teat, the laminate 1 has an advantage of being little wrinkled.

For instance, the laminate 1 has a diameter d of a circle or a long axis d of an ellipse, which is 5 to 40 mm in length and, specifically, 10 to 40 mm in length. In the case of the ellipse, further, it is desired that the length of the short axis d' thereof is about 50 to 90% the length of the long axis d.

In terms of the absolute value, it is desired that the length of the short axis d' is not less than 2.5 mm and, more desirably, not less than 4 mm.

Figure 4:
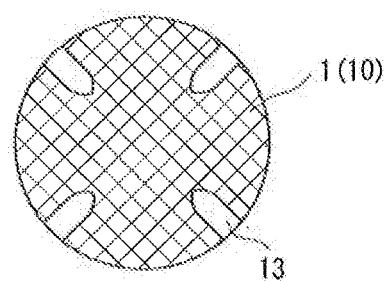
FIG. 4 It is a view showing a preferred planar shape of the teat opening protection patch of the type (α).

As shown in FIG. 4, further, it is desired that the teat patch 10 of the type (α) for sticking to the teat openings is provided with slits 13. The slits 13 are provided in a plural number (usually, about 2 to about 4) each stretching toward the center of the circle or the ellipse. Therefore, though the area for sticking to the side surface of the teat is small, the teat patch 10 is allowed to highly follow up the change in the shape of the teat. Moreover, the elastic sheet 2 can be easily turned up facilitating the operation for sticking to the teats as well as the work for removing from the teats.

The size of the slits 13 should be such that the teat opening is not exposed through the slits 13 when the laminate 1 is stuck to the teat. For instance, the size of the slits 13 should be, preferably, about 10 to about 40% of the diameter d of the circle or of the long axis d of the ellipse.

Furthermore, in order that the adhesive force to the teat will not be decreased by the formation of the slits 13, it is desired that the slits each have a suitable size (area) Moreover, in order that there is no difference in the adhesive force to the teats, it is desired that the plurality of slits 13 are symmetrically arranged.

FIG. 4 has shown an embodiment in which the circular laminate 1 was provided with the slits 13. It should, however, be noted that the slits 13 can also be formed in the elliptical laminate 1, too.

Type (β) for Sticking to the Side Surfaces of the Teats;

The teat patch 10 of the type (β) for sticking to the side surfaces of the teats has the laminate 1 which as a whole is of a non-circular planar shape or a non-elliptical planar shape. A representative planar shape thereof is shown in FIG. 5.

As will be understood from FIG. 5, the laminate 1 has a circular or elliptic teat opening-sticking portion 21 as shown in FIG. 4 above and, further, has teat side surface-sticking portions 23 (hereinafter simply referred to as side surface-sticking portions) that are stretching outward from the teat opening-sticking portion 21.

Figure 5:
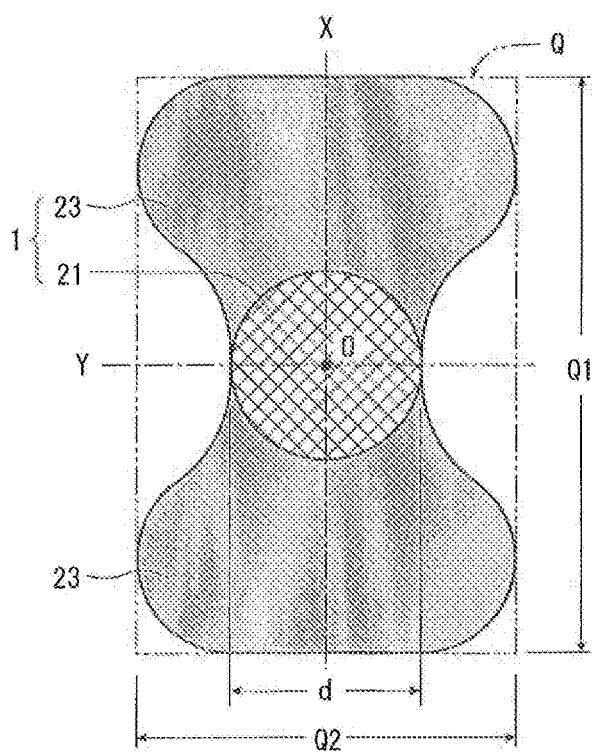
FIG. 5 It is a view showing a planar shape of the teat opening protection patch of the type (β).

In FIG. 5 and other drawings that will be referred to later, the teat opening-sticking portion located at the center and the side surface-sticking portions 23 are represented by using different hatched lines. However, this is for simply and easily drawing the figures. In practice, therefore, the teat opening-sticking portion 21 and the side surface-sticking portions 23 have not been clearly divided; i.e., they should be recognized from the entire shape of the laminate 1.

The laminate 1 has the side surface-sticking portions 23 that are extending outward from the teat opening-sticking portion 21. Therefore, the laminate 1 can be firmly adhered and fixed even to the side surfaces of the teat, is capable of following up the change in the shape of the teat, and its removal from the teat is reliably prevented.

Further, the laminate 1 from which the parting sheet 7 is removed is stuck at its teat opening-sticking portion 21 to the teat opening. In this state, while removing the protection film 5, the side surface-sticking portions 23 are folded and are adhered and fixed to the side surfaces of the teat. Therefore, the laminate 1 can be favorably stuck to the teat.

In the laminate 1 shown in FIG. 5, it is desired that the diameter of the circle or the long axis of the ellipse forming the teat opening-sticking portion 21 has a length of 5 to 40 mm and, specifically, 10 to 40 mm like that of the above-mentioned type shown in FIG. 4. That is, upon forming the teat opening-sticking portion 21 in this size, the teat opening can be reliably covered and protected. It is, here, desired that the teat opening-sticking portion 21 has the same shape as that of the type (α) for sticking to the teat opening.

It is desired that the laminate 1 is forming the side surface-sticking portions 23 in a plural number and, further, has a line symmetrical planar shape. The laminate 1 of this shape can be uniformly stuck with the teat opening as a center.

In the above planar shape, the circle (or ellipse) forming the teat opening-sticking portion 21 has its center O at a point where a vertical line X that is an axis of line symmetry intersects, at right Angles thereto, a transverse line Y that equally divides a maximum length of the laminate 1 into two in the direction of the vertical line. In the invention, it is desired that the side surface-sticking portions 23 are so formed that the teat opening-sticking portion 21 is exposed to the exterior at a plurality of places interposing at least the vertical line X or the transverse line Y among them.

Namely, forming the side surface-sticking portions 23 in a manner as described above has a meaning in that a suitable gap is formed among the neighboring side surface-sticking portions 23, and that the neighboring side surface-sticking portions 23 are so folded as will not stick to each other, facilitating the operation for sticking.

In the invention as will be understood from the laminate 1 of the form shown in FIG. 5, further, it is desired that the laminate 1 is of a form that has no corner portion where the straight lines intersect each other. For instance, the side surface-sticking portions 23 may have a rectangular shape. Even in such a case, however, the corner portions should be in a round shape free of sharpened portions. When stuck to the teat, the sharpened portions could be very easily turned up and removed.

Moreover, at least one of, and, desirably, all of the plurality of side surface-sticking portions 23 should have a shape that is becoming entirely widened outward. This increases the area of a portion that is adhered and fixed to the side surface of the teat. Besides, depending on the size of the side surface-sticking portions 23, the teat patch 10 can be adhered and fixed in a manner of completely covering the whole side surfaces of the teat. When the side surface-sticking portions are folded along the side surfaces of the teat, further, the teat patch 10 can be firmly fixed to the side surfaces of the teat in such a manner that the side surface-sticking portions 23 are overlapped one upon the other.

In the invention, the laminate 1 can be formed in a rectangular virtual circumscribing quadrilateral shape (denoted by Q in FIG. 5) As will be understood from FIG. 5, the virtual circumscribing quadrilateral Q has its each side circumscribing the laminate 1. Here it is desired that the long side Q1 thereof has a length in a range of 30 to 200 mm and, more preferably, 30 to 150 mm while the short side Q2 thereof has a length in a range of 20 to 150 mm and, more preferably, 30 to 100 mm. In short, it is most desired that the teat opening-sticking portion 21 and the teat side surface-sticking portions 23 have such sizes and shapes that enable the laminate 1 to form the virtual circumscribing quadrilateral Q of the above-mentioned size. Here, the long side Q1 and the short side Q2 may assume an equal length, as a matter of course.

That is, forming the virtual circumscribing quadrilateral Q of the above-mentioned size has a meaning in that the teat patch 10 is not the one that is adhered and fixed by being wound round the side surfaces of the teat but is the one that is adhered and fixed with its side surface-sticking portions being folded, adhered and fixed to the side surfaces of the teat in a state where the teat opening-sticking portion 21 is stuck to the teat opening. The teat patch 10 of the type that is fixed by being wound round becomes inevitably long, and is not capable of forming the virtual circumscribing quadrilateral Q of the above-mentioned size.

The teat protection patch 10 having the above shape of the present invention is not fixed by being wound round the side surfaces of the teat. Therefore, the protection patch 10 is little wrinkled at the portion that is stuck to the teat opening and, therefore, effectively suppresses the formation of a gap between the teat opening and the laminate 1 (adhesive layer 3) to reliably protect the teat opening.

The laminate 1 of the type (β) for sticking to the teat side surfaces is not limited to the one of the form shown in FIG. 5 but may assume a variety of forms so far as it satisfies the above-mentioned predetermined conditions such as line symmetry and the like. Embodiments of such other forms are shown in FIGS. 6 to 10.

The laminate 1 shown in FIG. 5 has, for example, a dumbbell shape as a whole, and includes two side surface-sticking portions 23 which are so formed as to face each other along the direction of a vertical line X which is a line symmetrical axis.

Figure 6:
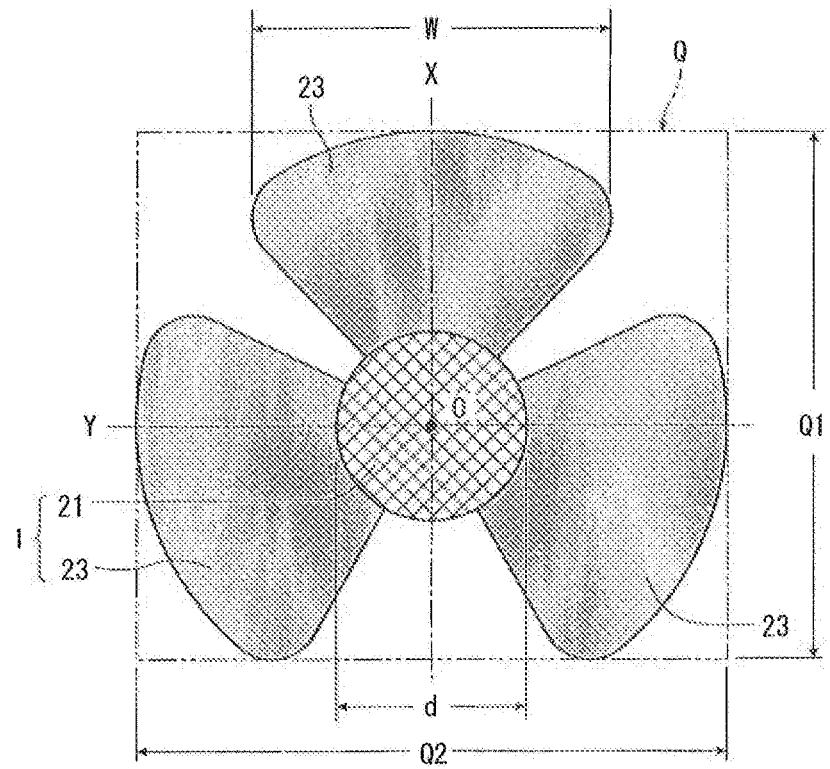
FIG. 6 It is a view showing a planar shape of the teat opening protection patch of the type (β).

On the other hand, the laminate 1 shown in FIG. 6 has the form of a petal as a whole, and is forming three side surface-sticking portions 23 of the same shape.

Figure 7:
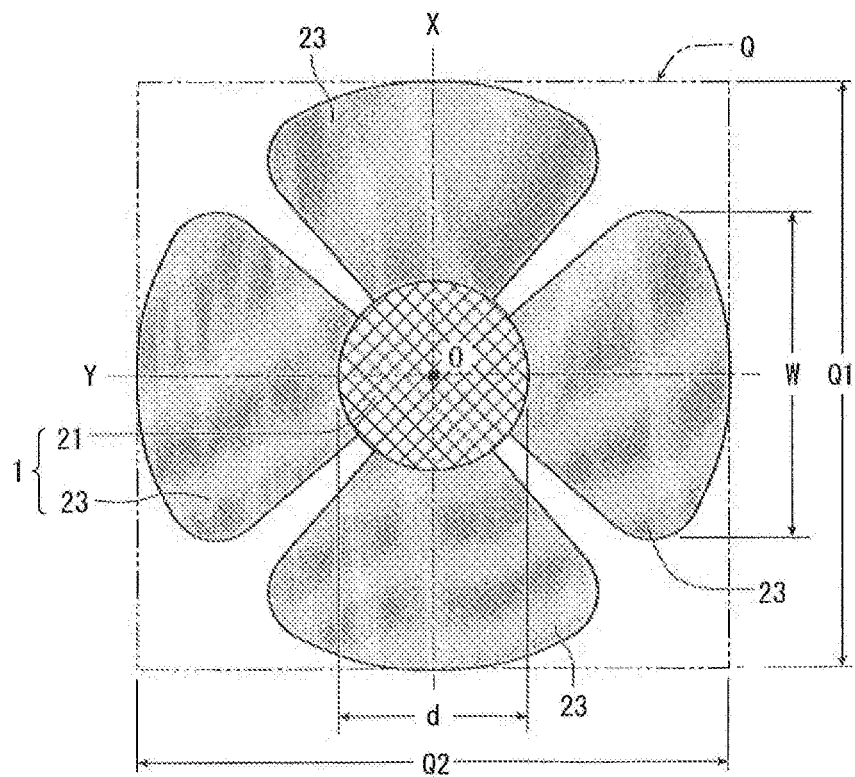
FIG. 7 it is a view showing a planar shape of the teat opening protection patch of the type (β).

The laminate 1 shown in FIG. 7, too, has the form of a pet a whole. In this case, however, there are formed four side surface-sticking portions 23 of the same shape, which are point symmetrical as a whole.

Figure 8:
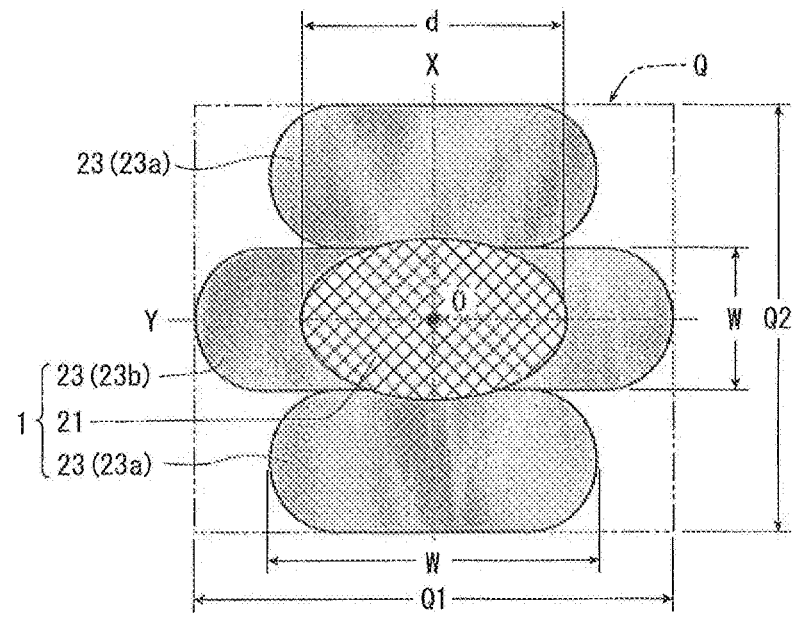
FIG. 8 It is a view showing a planar shape of the teat opening protection patch of the type (β).

The laminate 1 shown in FIG. 8 has the teat opening-sticking portion 21 of an elliptic shape, two large side surface-sticking portions 23a, and two small side surface-sticking portions 23b.

Figure 9:
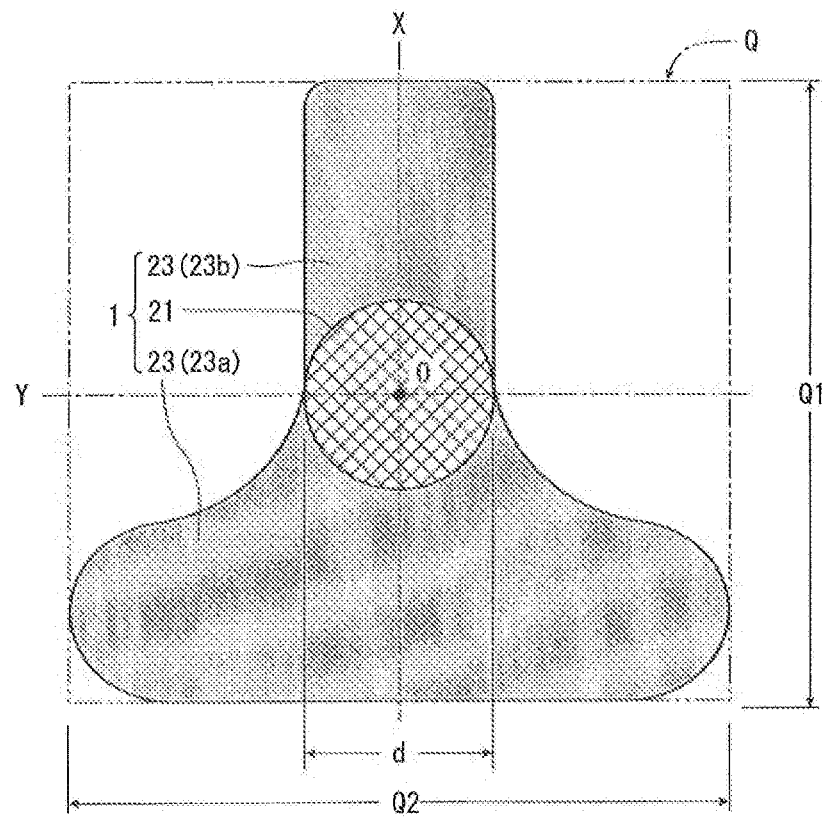
FIG. 9 It is a view showing a planar shape of the teat opening protection patch of the type (β).

The laminate 1 shown in FIG. 9 has the shape of an anchor as a whole, and has side surface-sticking portions 23b extending in a rectangular shape and a large flaring side surface-sticking portion 23a at a position opposed to the side surface-sticking portions 23b.

Figure 10:
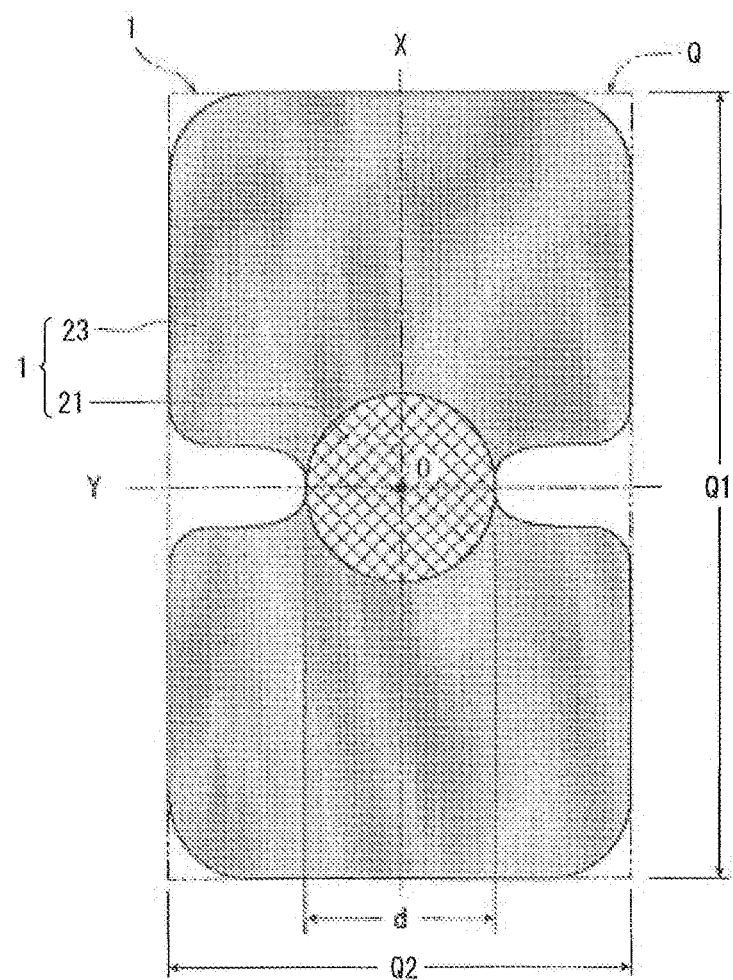
FIG. 10 It is a view showing a planar shape of the teat opening protection patch of the type (β).

The laminate 1 shown in FIG. 10 has the shape of a letter H as a whole, and is forming the teat opening-sticking portion 21 of a circular shape at the center, as well as along transverse line Y two side surface-sticking portions 23 of nearly a rectangular shape at positions facing each other.

In the laminates 1 of the shapes shown in FIGS. 6 to 10, too, as a matter of course, it is desired that the rectangular virtual circumscribing quadrilaterals (denoted by Q in FIGS. 6 to 10) have their long sizes Q1 whose lengths are in a range of 30 to 200 mm and short sizes Q2 whose lengths are in a range of 20 to 100 mm.

It will be understood that any laminates 1 of FIGS. 5 to 10 are, at least, line symmetrical, are forming predetermined virtual circumscribing quadrilaterals Q, but are not quite forming any sharp corner portions where straight lines intersect each other.

The number and size of the side surface-sticking portions 23 are suitably set in a range in which the above virtual circumscribing quadrilateral Q can be formed in a predetermined size to facilitate the work of sticking as well as the work of removal from the teats after the passage of a predetermined period of protection time.

In the patch of the type (β) for sticking to the teat side surfaces shown in FIGS. 5 to 10, furthermore, if the area of the rectangular virtual circumscribing quadrilateral Q is presumed to be 100%, then the area of the laminate 1 is, desirably, 40 to 98% thereof. As the area of the laminate 1 approaches 100%, the shape thereof approaches the rectangular circumscribing quadrilateral Q. Upon satisfying the area requirement of the laminate 1, it is made possible to improve the workability and to suppress the occurrence of float•wrinkles of the laminate 1 after it has been stuck. To further improve the workability and to maintain the laminate 1 in a further improved state after it has been stuck, it is desired that if the area of the rectangular virtual circumferential quadrilateral Q is presumed to be 100%, then the area of the laminate is 55 to 95% and, most desirably, is 55 to 80%.

Though FIGS. 5 to 10 are showing only representative examples, the laminate 1 of the type (β) for sticking to the teat side surfaces can be maintained closely adhered to the teats without being removed for not less than 10 days and, preferably, for about two weeks irrespective of the individual livestock to reliably protect the teat openings. As a result, for example, the cattle can be reliably prevented from being infected in the dry period.

Figure 11:
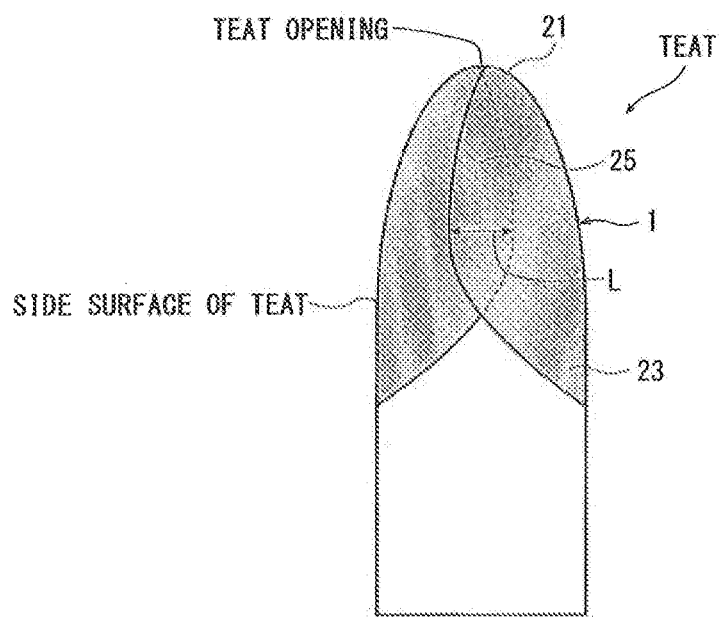
FIG. 11 It is a sectional view schematically illustrating, together with a teat, the state of the teat opening protection patch of the type (β) stuck to the teat.

As shown, for example, in FIG. 11, the protection patch 10 (laminate 1) is adhered and fixed to the teat opening in a manner that the teat opening-sticking portion 21 covers the teat opening, while the side surface-sticking portions 23 are folded and are adhered and fixed to the side surfaces of the teat. Moreover, as shown in FIG. 11, the protection patch 10 may have the side surface-sticking portions 23 of a widely spreading form. In this case, the side surface-sticking portions 23 can be overlapped as designated at 25 on the side surface of the teat, and can be firmly adhered and fixed to the side surface of the teat. The overlapped portion 25 has a maximum width L which may vary depending on the size and shape of the teat, and cannot be exclusively specified. To attain favorable operability, to secure improved adhesion and to reduce wrinkles, however, the maximum width L should, preferably, be not less than 2 mm but not more than 45 mm, more preferably, not less than 3 mm but not more than 30 mm, and, further preferably, not less than 3 mm but not more than 15 mm. In sticking the laminate 1 onto the teats, the overlapped portion 25 can be formed by slightly stretching the laminate 1 while sticking it.

EXAMPLES

The present invention will now be described by way of Examples to which only, however, the invention is in no way limited.

In Examples and Comparative Examples, measurements were taken relying upon the methods that are described below.

<Measuring the Double-Stretched Tensile Stress>

As the measuring apparatus, there was used a tension tester (Model; EZ Test/EZ-SX) manufactured by Shimazu Mfg. Co.

In compliance with the JIS K7127: 1999, a test piece of the laminate was measured for its tensile stress when stretched to twice its length and for its tensile modulus of elasticity under the conditions of an inter-chuck distance of 20 mm, a tension speed of 50 mm/min. and a sample width (width of laminate) of 20 mm.

Here, since the laminate possessed the adhesive layer, two pieces of laminates were stuck together via their adhesive layers, and a half value of the tensile stress when stretched twice their length was regarded as a tensile stress of a piece of the laminate.

<Testing the Sticking to the Pseudo Teat>

Figure 12:
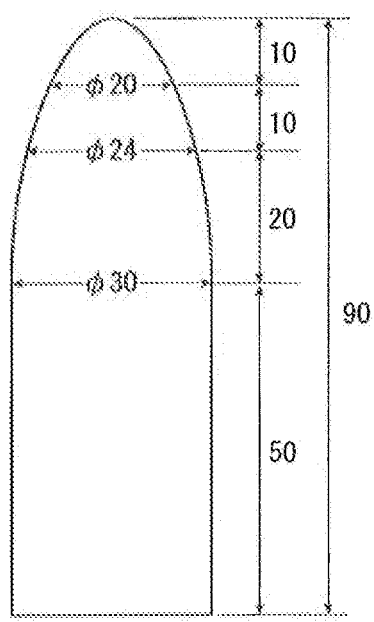
FIG. 12 It is a side view of a pseudo teat used for conducting pseudo tests in Examples and Comparative Examples of the present invention.

A nipple (made of a natural rubber) for a feeding bucket shown in FIG. 12 was used as a pseudo teat. A teat opening protection patch prepared by the above-mentioned method was stuck to the end of the pseudo teat. The protection patch was evaluated with the eye for its wrinkled state on the teat opening immediately after it was stuck and after it has been stuck (after 7 days have passed).

In FIG. 12, numerals are in millimeters.

<Counting the Number of Bacteria Using the Pseudo Teat>

The teat opening protection patch was stuck to the end of the pseudo teat as described above. After 7 days have passed, the end of the pseudo teat opening was dipped for about 10 seconds in a soil-like material that had been used as a bedding in a cowhouse of a dairy farmer.

Thereafter, the teat opening protection patch that is a sample was carefully removed so that the end of the pseudo teat was not contaminated. An applicator (Promedia ST-25, produced by Elmex Co.) was used to wipe out about 1 cm$^2$ of a portion that corresponded to the teat opening to where the teat opening protection patch had been stuck. The applicator was dipped in 10 mL of a physiological saline solution.

One milliliter of the above solution was dropped on a culture ground (culture ground for aerobic bacterial, 6400AC, produced by 3M Co.) and was cultivated at 37° C. for 48 hours. After cultivated, the number of colonies in the culture ground was counted. Presuming that each bacteria formed each colony, the number of bacteria in 10 mL of the physiological saline solution was calculated from the number of colonies according to the following formula, Number of colonies×10=number of bacteria The numbers of bacteria that were found were evaluated on the following basis. In general, if the number of bacteria is less than 1000 bacteria/cm$^2$, then it can be judged that the teat opening is maintained clean. The results were judged on the following basis.

⊚: The number of bacteria was less than 100 bacteria/cm$^2$.

The number of bacteria was very small, and the interior of the patch was maintained very clean.

○: The number of bacteria was not less than 100 bacteria/cm$^2$ but is less than 1000 bacteria/cm$^2$.

The number of bacteria was small, and the interior of the patch was maintained clean.

Δ: The number of bacteria was not less than 1000 bacteria/cm but was less than 10000 bacteria/cm$^2$.

The number of bacteria was slightly large but was smaller than the number of the external bacteria.

x: The number of bacteria was not less than 10000 bacteria/cm$^2$.

The number of bacteria was so large that the effect for controlling the bacteria by using the patch could not be confirmed.

Here, the number of external bacteria (number of bacteria in the soil) was subject to vary but was roughly not less than 10000 bacteria/cm$^2$.

<Evaluating the Sustenance of Adhesion of Patches to the Real Dairy Cattle>

Three Holstein dairy cattle were used. The sample protection patches (laminates) were stuck as shown in FIG. 2 to the ends (teat openings) of four teats of each dairy cattle, and the sustenance of adhesion was evaluated.

The three Holstein dairy cattle tested this time were all in the dry season. By taking differences depending on the individual dairy cattle into consideration, furthermore, the dairy cattle to which the protection patches were to be stuck were replaced after 7 days have passed, and the sustenance of adhesion was evaluated. Here, prior to sticking the protection patches, foul and sebum adhered to the ends of the teats were wiped out with a wet tissue paper.

The state the protection patches remained adhered was evaluated in four stages on the following basis.

3: The protection patches were not removed or were not floating from the teats.

2: The edges of the protection patches were floating.

1: The edges of the protection patches were completely removed.

0: The protection patches as a whole were completely removed.

<Laminate>

In Examples and Comparative Examples, the laminates A, B and C shown in Table 1 below were used as the protection patches.

The adhesive layers of the laminates A, B and C were all formed by using an acrylic adhesive agent.

TABLE 1

|  | Elastic sheet | Thickness of elastic sheet (μm) | Adhesive agent | Thickness of adhesive layer (μm) | Double-stretched tensile stress (N) | Tensile modulus of elasticity (MPa) |
| --- | --- | --- | --- | --- | --- | --- |
| Laminate A | urethane | 15 | acrylic adhesive | 10 | 0.5 | 0.1 |
| Laminate B | urethane | 60 | acrylic adhesive | 10 | 2 | 0.1 |
| Laminate C | polyethylene | 15 | acrylic adhesive | 10 | 10 | 4.8 |

Experiment 1

The following experiments were conducted in order to evaluate the teat patches of the type (α).

Example 1-1

The laminate A shown in Table 1 was cut to prepare a teat opening protection patch (type (α)) of a diameter d of 15 mm.

The teat patch was stuck to the pseudo teat to test its stickiness to the teat. However, no wrinkle was observed either just after it was stuck or after it has been stuck (after 7 days have passed). Further, the number of bacteria on the pseudo teat was counted based on the above-mentioned method. The results were as shown in Table 2.

Sustenance of patch adhesion was also evaluated by using the real dairy cattle. The results were as shown in Table 3.

For comparison, the laminate A was cut into a circle 50 mm in diameter and was stuck to the pseudo teat. Wrinkles developed to a slight degree at the curved portions stuck to the teat. The wrinkles, however, disappeared after the elastic sheet 2 of the outermost layer was adhered together.

Example 1-2

The circular laminate prepared in Example 1-1 was cut to form slits at four places as shown in FIG. 4 to prepare a teat patch (type (α)). The slits were each 2 mm in length and 1 mm in width, and were arranged at an equal interval. By using the pseudo teat, the thus obtained teat patch was tested for its stickiness and was counted for the number of bacteria. The results were as shown in Table 2.

Example 1-3

A teat patch was prepared in the same manner as in Example 1-1 but using the laminate B. By using the pseudo teat, the teat patch was tested for its stickiness and was counted for the number of bacteria on the pseudo teat. The results were as shown in Table 2.

Example 1-4

A circular teat patch (type (α)) 30 mm in diameter was prepared by cutting the laminate A. In other respects, the teat patch was stuck to the pseudo teat and was counted for the number of bacteria on the pseudo teat in the same manner as in Example 1-1. The results were as shown in Table 2.

Comparative Example 1-1

A teat patch was prepared in the same manner as in Example 1-1 but using the laminate C. By using the pseudo teat, the teat patch was tested for its stickiness and was counted for the number of bacteria on the pseudo teat. The results were as shown in Table 2.

Sustenance of patch adhesion was also evaluated by using the real dairy cattle. The results were as shown in Table 3.

TABLE 2

| | Laminate | Shape of patch | Adhesion to the pseudo test | | Number of bacteria |
|---|---|---|---|---|---|
| | | | Immediately after stuck | 7 Days after stuck | |
| Example 1-1 | Laminate A | circle, diameter d = 15 mm | no wrinkle | no wrinkle | ◉ |
| Example 1-2 | Laminate A | circle, diameter d = 15 mm, 4 slits, each 2 mm long, 1 mm wide | no wrinkle | no wrinkle | ◉ |
| Example 1-3 | Laminate B | circle, diameter d = 15 mm | no wrinkle | wrinkled to some extent | ○ |
| Example 1-4 | Laminate A | circle, diameter d = 30 mm | no wrinkle | no wrinkle | ◉ |
| Comparative Example 1-1 | Laminate C | circle, diameter d = 15 mm | no wrinkle | edges floated | Δ |

TABLE 3

| | Laminate | Dairy cattle | Teat position | State of adhesion of teat patch | | | | | |
|---|---|---|---|---|---|---|---|---|---|
| | | | | Immediately after stuck | 1 day after | 2 days after | 3 days after | 5 days after | 7 days after |
| Example 1-1 | laminate A | dairy cattle 1 | right front | 3 | 3 | 3 | 3 | 3 | 3 |
| | | | right rear | 3 | 3 | 3 | 3 | 3 | 2 |
| | | | left front | 3 | 3 | 3 | 3 | 3 | 3 |
| | | | left rear | 3 | 3 | 3 | 3 | 2 | 2 |
| | | dairy cattle 2 | right front | 3 | 3 | 3 | 3 | 3 | 2 |
| | | | right rear | 3 | 3 | 3 | 3 | 3 | 2 |
| | | | left front | 3 | 3 | 3 | 3 | 3 | 3 |
| | | | left rear | 3 | 3 | 3 | 3 | 3 | 2 |
| Comparative Example 1-1 | laminate C | dairy cattle 1 | right front | 3 | 3 | 2 | 0 | 0 | 0 |
| | | | right rear | 3 | 2 | 2 | 1 | 0 | 0 |
| | | | left front | 3 | 3 | 3 | 0 | 0 | 0 |
| | | | left rear | 3 | 2 | 0 | 0 | 0 | 0 |
| | | dairy cattle 2 | right front | 3 | 2 | 2 | 0 | 0 | 0 |
| | | | right rear | 3 | 3 | 2 | 1 | 0 | 0 |
| | | | left front | 3 | 3 | 2 | 1 | 0 | 0 |
| | | | left rear | 3 | 3 | 1 | 0 | 0 | 0 |

Experiment 2

The following experiments were conducted in order to evaluate the teat patches of the type (β).

Example 2-1

A line symmetrical teat patch shown in FIG. 5 was prepared by using the laminate A shown in Table 1. The circular teat opening-sticking portion 21 possessed a diameter d of 25 mm, and the virtual circumscribing quadrilateral possessed a long side Q1 of a length of 80 mm and a short side Q2 of a length of 55 mm. If the area of the virtual circumscribing quadrilateral Q was presumed to be 100%, then the area of the laminate A was 77%.

The teat patch was stuck to the pseudo teat in a manner as shown in FIG. 11, and was tested for its stickiness to the pseudo teat in the same manner as in Example 1-1. The results were as shown in Table 4. When stuck to the pseudo teat as shown in FIG. 11, a maximum width of the overlapping portion 25 was about 8 mm.

Sustenance of patch adhesion was also evaluated by using the real dairy cattle. The results were as shown in Table 5.

In the test for evaluating the sustenance of patch adhesion, the patches could be very easily stuck to the teats.

With the sticking workability in Example 2-1 as a reference, the sticking workability in other Examples was also evaluated on the following basis.

⊚: The sticking work could be conducted just as easily as in Example 2-1.
○: The sticking work could be conducted without any problem but not as easily as in Example 2-1.
Δ: The patch could be stuck to the teat without any problem but could be stuck to the side surfaces of the teat involving difficulty.

For comparison, the length of the maximum width (short side Q2) of the side surface-sticking portions 23 was decreased a little so that when the patch was stuck to the pseudo teat as shown in FIG. 11, there was formed no overlapping portion 25 but a gap of about 7 mm was formed between the side surface-sticking portions 23. By using the real dairy cattle, the protection patches were evaluated for the sustenance of adhesion and it was learned that after the passage of 7 days, the patches started separating away from the teats.

Example 2-2

A teat patch of the shape shown in FIG. 6 was prepared by using the laminate A shown in Table 1. The circular teat opening-sticking portion 21 possessed a diameter d of 20 mm, and the virtual circumscribing quadrilateral possessed a long side Q1 of a length of 90 mm and a short side Q2 of a length of 80 mm. If the area of the virtual circumscribing quadrilateral Q was presumed to be 100%, then the area of the laminate A was 62%.

The side surface-sticking portions 23 possessed a maximum width w of 45 mm.

The teat patch was stuck to the pseudo teat in a manner as shown in FIG. 11, and was tested for its stickiness to the pseudo teat and was, further, evaluated for its sustenance of adhesion by using the real dairy cattle in the same manner as in Example 2-1. The results were as shown in Tables 4 and 5.

When stuck to the pseudo teat as shown in FIG. 11, a maximum width of the overlapping portion 25 was about 13 mm.

Example 2-3

A teat patch of the shape shown in FIG. 7 was prepared by using the laminate A shown in Table 1. The circular teat opening-sticking portion 21 possessed a diameter d of 20 mm, and the virtual circumscribing quadrilateral possessed a long side Q1 of a length of 90 mm and a short side Q2 of a length of 90 mm. If the area of the virtual circumscribing quadrilateral Q was presumed to be 100%, then the area of the laminate A was 67%.

The side surface-sticking portions 23 possessed a maximum width w of 45 mm.

The teat patch was stuck to the pseudo teat in a manner as shown in FIG. 11, and was tested for its stickiness to the pseudo teat and was, further, evaluated for its sustenance of adhesion by using the rear dairy cattle in the same manner as in Example 2-1. The results were as shown in Tables 4 and 5.

When stuck to the pseudo teat as shown in FIG. 11, a maximum width of the overlapping portion 25 was about 11 mm.

Example 2-4

A teat patch of the shape shown in FIG. 8 was prepared by using the laminate A shown in Table 1. The elliptical teat opening-sticking portion 21 possessed a long axis d of a length of 35 mm. The virtual circumscribing quadrilateral possessed the sides Q1 and Q2 which were both 90 mm in length.

If the area of the virtual circumscribing quadrilateral Q was presumed to be 100%, then the area of the laminate A was 80%.

The side surface-sticking portions 23a possessed a maximum width w of 50 mm while the side surface-sticking portions 23b possessed a maximum width w of 25 mm.

The teat patch was stuck to the pseudo teat in a manner as shown in FIG. 11, and was tested for its stickiness to the pseudo teat and was, further, evaluated for its sustenance of adhesion by using the real dairy cattle in the same manner as in Example 2-1. The results were as shown in Tables 4 and 5.

When stuck to the pseudo teat as shown in FIG. 11, a maximum width of the overlapping portion 25 was about 14 mm.

Example 2-5

A teat patch of the shape shown in FIG. 9 was prepared by using the laminate A shown in Table 1. The circular teat opening-sticking portion 21 possessed a diameter d of 25 mm, and the virtual circumscribing quadrilateral possessed a long side Q1 of a length of 100 mm and a short side Q2 of a length of 80 mm. If the area of the virtual circumscribing quadrilateral Q was presumed to be 100%, then the area of the laminate A was 50%.

The teat patch was stuck to the pseudo teat in a manner as shown in FIG. 11, and was tested for its stickiness to the pseudo teat and was, further, evaluated for its sustenance of adhesion by using the real dairy cattle in the same manner as in Example 2-1. The results were as shown in Tables 4 and 6.

When stuck to the pseudo teat as shown in FIG. 11, a maximum width of the overlapping portion 25 was about 5 mm.

Example 2-6

A teat patch of the shape shown in FIG. 5 was prepared by using the laminate B shown in Table 1. The circular teat opening-sticking portion 21 possessed a diameter d of 25 mm, and the virtual circumscribing quadrilateral possessed a long side Q1 of a length of 80 mm and a short side Q2 of a length of 55 mm. If the area of the virtual circumscribing quadrilateral Q was presumed to be 100%, then the area of the laminate A was 77%.

The side surface-sticking portions 23 possessed a maximum width w of 40 mm.

The teat patch was stuck to the pseudo teat in a manner as shown in FIG. 11, and was tested for its stickiness to the pseudo teat and was, further, evaluated for its sustenance of adhesion by using the real dairy cattle in the same manner as in Example 2-1. The results were as shown in Tables 4 and 6.

When stuck to the pseudo teat as shown in FIG. 11, a maximum width of the overlapping portion 25 was about 8 mm.

Example 2-7

A teat patch of the shape shown in FIG. 10 was prepared by using the laminate A shown in Table 1 The circular teat opening-sticking portion 21 possessed a diameter d of 25 mm, and the virtual circumscribing quadrilateral possessed a long side Q1 of a length of 100 mm and a short side Q2 of a length of 60 mm. If the area of the virtual circumscribing quadrilateral Q was presumed to be 100%, then the area of the laminate A was 92.5%.

The teat patch was stuck to the pseudo teat in a manner as shown in FIG. 11, and was tested for its stickiness to the pseudo teat and was, further, evaluated for its sustenance of adhesion by using the real dairy cattle in the same manner as in Example 2-1. The results were as shown in Tables 4 and 6.

When stuck to the pseudo teat as shown in FIG. 11, a maximum width of the overlapping portion 25 was about 9 mm.

Comparative Example 2-1

A teat patch of the shape quite the same as that of Example 2-1 (embodiment of FIG. 5) was prepared but using the laminate C shown in Table 1.

The teat patch was stuck to the pseudo teat in a manner as shown in FIG. 11, and was tested for its stickiness to the pseudo teat and was, further, evaluated for its sustenance of adhesion by using the real dairy cattle in the same manner as in Example 2-1. The results were as shown in Tables 4 and 6.

TABLE 4

|  |  | Form | | | | Stickiness to the pseudo teat | |
|---|---|---|---|---|---|---|---|
|  |  | Teat stick portion | Side surfaces | | | | |
|  |  | Circle, diameter | | | Maximum | | |
|  | Laminate | d (ellipse, long axis d) (mm) | Q1 (mm) | Q2 (mm) | overlapping width (mm) | Immediately after stuck | 7 Days after stuck |
| Example 2-1 | laminate A | d = 25 | 80 | 55 | about 8 | no wrinkle | no wrinkle |
| Example 2-2 | laminate A | d = 20 | 90 | 80 | about 13 | no wrinkle | no wrinkle |
| Example 2-3 | laminate A | d = 20 | 90 | 90 | about 11 | no wrinkle | no wrinkle |
| Example 2-4 | laminate A | d = 35 | 90 | 90 | about 14 | no wrinkle | no wrinkle |
| Example 2-5 | laminate A | d = 25 | 100 | 80 | about 5 | no wrinkle | no wrinkle |
| Example 2-6 | laminate B | d = 25 | 80 | 55 | about 8 | no wrinkle | slightly wrinkled |
| Example 2-7 | laminate A | d = 25 | 100 | 60 | about 9 | no wrinkle | no wrinkle |
| Comparative Example 2-1 | laminate C | d = 25 | 80 | 55 | about 8 | no wrinkle | edges floated |

TABLE 5

|  | Sticking workability | Dairy cattle | Teat position | Stuck state | | | | | | | |
|---|---|---|---|---|---|---|---|---|---|---|---|
|  |  |  |  | Right after stuck | 1 Day after | 2 Days after | 3 Days after | 5 Days after | 7 Days after | 10 Days after | 14 Days after |
| Example 2-1 | ◎ | 1 | right front | 3 | 3 | 3 | 3 | 3 | 3 | 3 | 3 |
|  |  | 2 | right rear | 3 | 3 | 3 | 3 | 3 | 3 | 3 | 3 |
|  |  | 3 | left front | 3 | 3 | 3 | 3 | 3 | 3 | 3 | 2 |
|  |  | 4 | left rear | 3 | 3 | 3 | 3 | 3 | 2 | 2 | 2 |
|  |  | 5 | right front | 3 | 3 | 3 | 3 | 3 | 3 | 3 | 3 |
|  |  | 6 | right rear | 3 | 3 | 3 | 3 | 3 | 3 | 3 | 3 |
|  |  |  | average | 3.0 | 3.0 | 3.0 | 3.0 | 3.0 | 2.8 | 2.8 | 2.7 |
| Example 2-2 | ○ | 1 | right rear | 3 | 3 | 3 | 3 | 3 | 3 | 3 | 2 |
|  |  | 2 | left front | 3 | 3 | 3 | 3 | 3 | 3 | 2 | 2 |
|  |  | 3 | left rear | 3 | 3 | 3 | 3 | 3 | 3 | 3 | 3 |
|  |  | 4 | right front | 3 | 3 | 3 | 3 | 3 | 3 | 3 | 2 |
|  |  | 5 | right rear | 3 | 3 | 3 | 3 | 3 | 2 | 2 | 1 |
|  |  | 6 | left front | 3 | 3 | 3 | 3 | 3 | 3 | 3 | 2 |
|  |  |  | average | 3.0 | 3.0 | 3.0 | 3.0 | 3.0 | 2.8 | 2.7 | 2.0 |
| Example 2-3 | Δ | 1 | left front | 3 | 3 | 3 | 3 | 3 | 3 | 3 | 2 |
|  |  | 2 | left rear | 3 | 3 | 3 | 3 | 3 | 2 | 2 | 1 |
|  |  | 3 | right front | 3 | 3 | 3 | 3 | 3 | 3 | 3 | 3 |

TABLE 5-continued

| | Sticking workability | Dairy cattle | Teat position | Stuck state |||||||
|---|---|---|---|---|---|---|---|---|---|---|---|
| | | | | Right after stuck | 1 Day after | 2 Days after | 3 Days after | 5 Days after | 7 Days after | 10 Days after | 14 Days after |
| | | 4 | right rear | 3 | 3 | 3 | 3 | 3 | 3 | 3 | 1 |
| | | 5 | left front | 3 | 3 | 3 | 3 | 3 | 3 | 2 | 2 |
| | | 6 | left rear | 3 | 3 | 3 | 3 | 3 | 3 | 2 | 2 |
| | | | average | 3.0 | 3.0 | 3.0 | 3.0 | 3.0 | 2.8 | 2.5 | 1.8 |
| Example 2-4 | Δ | 1 | left rear | 3 | 3 | 3 | 3 | 3 | 3 | 3 | 3 |
| | | 2 | right front | 3 | 3 | 3 | 3 | 3 | 3 | 3 | 3 |
| | | 3 | right rear | 3 | 3 | 3 | 3 | 3 | 3 | 2 | 2 |
| | | 4 | left front | 3 | 3 | 3 | 2 | 2 | 1 | 1 | 1 |
| | | 5 | left rear | 3 | 3 | 3 | 3 | 2 | 2 | 1 | 0 |
| | | 6 | right front | 3 | 3 | 3 | 3 | 3 | 3 | 3 | 2 |
| | | | average | 3.0 | 3.0 | 3.0 | 2.8 | 2.7 | 2.5 | 2.2 | 1.8 |

TABLE 6

| | Sticking workability | Dairy cattle | Teat position | Stuck state |||||||
|---|---|---|---|---|---|---|---|---|---|---|---|
| | | | | Right after stuck | 1 Day after | 2 Days after | 3 Days after | 5 Days after | 7 Days after | 10 Days after | 14 Days after |
| Example 2-5 | ◎ | 1 | right front | 3 | 3 | 3 | 3 | 3 | 3 | 3 | 3 |
| | | 2 | right rear | 3 | 3 | 3 | 3 | 3 | 3 | 2 | 2 |
| | | 3 | left front | 3 | 3 | 3 | 3 | 3 | 3 | 3 | 3 |
| | | 4 | left rear | 3 | 3 | 3 | 3 | 3 | 3 | 2 | 3 |
| | | 5 | right front | 3 | 3 | 3 | 3 | 3 | 3 | 3 | 2 |
| | | 6 | right rear | 3 | 3 | 3 | 3 | 3 | 3 | 2 | 2 |
| | | | average | 3.0 | 3.0 | 3.0 | 3.0 | 3.0 | 3.0 | 2.7 | 2.5 |
| Example 2-6 | ◎ | 1 | right rear | 3 | 3 | 3 | 3 | 3 | 3 | 2 | 2 |
| | | 2 | left front | 3 | 3 | 3 | 3 | 3 | 3 | 2 | 2 |
| | | 3 | left rear | 3 | 3 | 3 | 3 | 3 | 3 | 2 | 1 |
| | | 4 | right front | 3 | 3 | 3 | 3 | 3 | 3 | 2 | 2 |
| | | 5 | right rear | 3 | 3 | 3 | 3 | 3 | 2 | 2 | 1 |
| | | 6 | left front | 3 | 3 | 3 | 3 | 3 | 3 | 3 | 2 |
| | | | average | 3.0 | 3.0 | 3.0 | 3.0 | 3.0 | 2.8 | 2.2 | 1.7 |
| Example 2-7 | ◎ | 1 | right rear | 3 | 3 | 3 | 3 | 3 | 3 | 3 | 3 |
| | | 2 | left front | 3 | 3 | 3 | 3 | 3 | 3 | 3 | 2 |
| | | 3 | left rear | 3 | 3 | 3 | 3 | 3 | 3 | 3 | 2.5 |
| | | 4 | right front | 3 | 3 | 3 | 3 | 3 | 3 | 3 | 3 |
| | | 5 | right rear | 3 | 3 | 3 | 3 | 3 | 3 | 3 | 2.5 |
| | | 6 | left front | 3 | 3 | 3 | 3 | 3 | 3 | 3 | 3 |
| | | | average | 3.0 | 3.0 | 3.0 | 3.0 | 3.0 | 3.0 | 3.0 | 2.7 |
| Comp. Example 2-1 | ◎ | 1 | left front | 3 | 3 | 3 | 3 | 3 | 3 | 2 | 1 |
| | | 2 | left rear | 3 | 3 | 3 | 3 | 2 | 2 | 2 | 0 |
| | | 3 | right front | 3 | 3 | 3 | 3 | 3 | 2 | 2 | 2 |
| | | 4 | right rear | 3 | 3 | 3 | 3 | 3 | 3 | 1 | 0 |
| | | 5 | left front | 3 | 3 | 3 | 3 | 3 | 3 | 2 | 0 |
| | | 6 | left rear | 3 | 3 | 3 | 3 | 3 | 3 | 2 | 1 |
| | | | average | 3.0 | 3.0 | 3.0 | 3.0 | 2.8 | 2.7 | 1.8 | 0.7 |

DESCRIPTION OF REFERENCE NUMERALS

1: laminate
2: elastic sheet
3: adhesive layer
5: protection film
7: parting sheet
10: teat opening protection patch
21: teat opening-sticking portion
23: teat side surface-sticking portions
25: overlapping portion
Q: circumscribing quadrilateral
X: symmetrical axis (vertical line)
Y: transverse line intersecting the vertical line at right angles

The invention claimed is:

1. A teat opening protection patch to be stuck to a portion inclusive of a teat opening of livestock, including a laminate of an elastic sheet and an adhesive layer laminated on one surface of the elastic sheet, said laminate having a double-stretched tensile stress in range of 0.1 to 5 N, wherein,
 (a) the laminate has a circular or elliptic planar shape, and
 (b) the planar shape is imparted to a part to be adhered to the teat opening, wherein said laminate has at least a line symmetrical planar shape and includes:
  a circular or elliptic portion for sticking to the teat opening having, as a center, a point where a vertical line that is an axis of line symmetry intersects, at right angles thereto, a transverse line that equally divides a maximum length of the laminate into two in a direction of the vertical line; and
  a plurality of portions for sticking to a side surface of a teat and extending outwards from said circular or elliptic portion for sticking to the teat opening so as to form overlapped portions of said plurality portions for sticking on the side surface of the teat when the plurality of portions are folded and are adhered to and fixed to the side surface of the teat.

2. The teat opening protection patch according to claim 1, wherein the portion for sticking to the teat opening is exposed to an exterior at a plurality of places interposing at least the vertical line or the transverse line among them.

3. The teat opening protection patch according to claim 1, wherein each of the overlapped portions has a maximum width of not less than 2 mm and not more than 45 mm.

4. The teat opening protection patch according to claim 2, wherein each of the overlapped portions has a maximum width of not less than 2 mm and not more than 45 mm.

5. The teat opening protection patch according to claim 1, wherein a diameter of the circular planar shape or a long axis of the elliptic planar shape is 5 to 40 mm in length.

6. The teat opening protection patch according to claim 5, wherein said laminate has at least one slit that is stretching from an outer circumferential portion thereof toward a center of the circular planar shape or the elliptic planar shape.

7. The teat opening protection patch according to claim 1, wherein said laminate has a planar shape without any corner portion where straight lines intersect each other.

8. The teat opening protection patch according to claim 7, wherein a diameter of the circular planar shape or a long axis of the elliptic planar shape forming the portion for sticking to the teat opening, has a length of 5 to 40 mm.

9. The teat opening protection patch according to claim 1, wherein the portions for sticking to the side surfaces of the teat have a shape expanding outwards.

10. The teat opening protection patch according to claim 1, wherein when a rectangular virtual circumscribing quadrilateral is formed on the planar shape of said laminate, a long side of said circumscribing quadrilateral has a length in a range of 30 to 200 mm while a short side thereof has a length in a range of 20 to 150 mm.

11. The teat opening protection patch according to claim 1, wherein a removable protection film is laminated on the surface of said laminate on the side opposite to the adhesive layer, and a parting sheet is stuck to the surface of said adhesive layer.

12. The teat opening protection patch according to claim 1, wherein said elastic sheet is formed of polyurethane.

13. The teat opening protection patch according to claim 1, wherein said elastic sheet is colored.

* * * * *